Nov. 29, 1955     F. V. ATKESON ET AL     2,725,320

METHOD OF PRODUCING BENT LAMINATED GLASS SHEETS

Filed Feb. 5, 1953

INVENTOR.
FLORIAN V. ATKESON
JAMES S. GOLIGHTLY

Oscar L. Spencer

ATTORNEY

United States Patent Office 2,725,320
Patented Nov. 29, 1955

2,725,320

METHOD OF PRODUCING BENT LAMINATED GLASS SHEETS

Florian V. Atkeson, Springdale, and James S. Golightly, Tarentum, Pa., assignors to Pittsburgh Plate Glass Company Application February 5, 1953, Serial No. 335,238

11 Claims. (Cl. 154—2.73)

This invention relates in general to the production of bent laminated glass sheets comprising two or more bent glass sheets having the adjacent faces of the glass adhered together by a layer of thermoplastic material.

The invention is specifically concerned with a parting material and the method of applying the parting material to one or more of the adjacent faces of the glass sheets so as to prevent fusion or marring of the adjacent faces of the sheets when heated during the bending operation.

In the manufacture of bent laminated glass, for automobile windshields and other viewing closures for vehicles, airplanes, etc., the glass must first be heated in order to bend the glass to the desired shape. The glass softens under the applied heat and as the sheets are usually bent in pairs to obtain satisfactory matching for lamination, one sheet moving relative to the other during bending may cause markings which impair the optical qualities of the laminated article or the softened hot glass surfaces fuse together necessitating scrapping of the glass. For these reasons it is old in the art to apply some refractory material between the sheets during the bending operation to prevent marring or fusion of the adjacent glass surfaces. Apparatus for bending the heat softened glass is also old in the art and forms no part of the present invention.

After the glass is bent to the desired shape, in any suitable apparatus, the usual practice is to anneal the glass sheets and then wash off the parting material before performing the laminating operation. The usual practice is to wash the flat glass sheets, dry the glass, apply the parting material, assemble the flat glass sheets in pairs, bend the glass, disassemble the sheets, wash and dry the sheets, reassemble the sheets with a layer of thermoplastic material between them and place the whole in an autoclave. Under the influence of heat and pressure in the autoclave the assembled sheets are adhered together by the thermoplastic material. These operations are all well known in the prior art.

The use of these laminated bent sheets as viewing closures and particularly windshields for vehicles and airplanes necessitates keeping the faces of the sheets in contact with the thermoplastic material free of all foreign matter and dirt which would impair vision through them. Many examples of prior attempts to accomplish this are found in prior patents and published literature. Various forms of parting materials have been suggested but all of these required either washing or wiping the parting material from the glass before laminating. Many parting materials not being water soluble could only be completely removed by wiping either before or after the washing operation. The wiping of the glass was done by so called lint free cloths or other material but were seldom successful in producing a satisfactorily clean surface on the glass. Usually smears, lint, fingermarks, etc., caused rejection of the windshield. Even after the washing and wiping operations had successfully produced a clean surface, dust, lint, etc., in the atmosphere settled on the cleaned surfaces before they could be assembled with the thermoplastic material.

The principal object of the present invention is to provide parting materials which will prevent marking or fusion of the glass during the bending operation and which do not require removal before laminating.

Another object of the invention is to provide method and apparatus for applying the selected parting material to the glass in a manner which facilitates subsequent lamination without first washing the parting material from the glass.

A further object of the invention is to reduce the number of operations required in bending and laminating the glass and so reduce the possibilities for contamination of the glass surfaces before applying the laminating material.

In the copending application of Atkeson et al., Serial No. 248,922, filed September 29, 1951, now U. S. Patent No. 2,697,676, there is disclosed apparatus for applying finely divided mica to the glass to serve as a parting agent and the recognition that when the mica was applied in a suitable thickness it combined optically with the thermoplastic material so that removal of the mica was unnecessary. Hence one washing and drying operation was eliminated thereby reducing the cost of manufacture. Another important result was that after bending, the sheets of glass were not separated until after they passed into the room where the plastic was disposed between the sheets. This room is usually air conditioned and free of atmospheric dust and lint so that another dirt hazard was eliminated.

In the present invention we have provided an improved method for applying the mica as a parting material and apparatus for practicing this method. We also disclose additional parting materials which may be substituted for the mica with improved results.

In the drawings forming part of this disclosure,

Fig. 1 indicates a conventional form of washer for the flat glass sheets;

Fig. 2 indicates in conventional form a suitable dryer, such as a resistance heater, for the washed flat glass sheets;

Fig. 3 is a conventional showing of a spray gun application of the mica in a water solution to the glass;

Fig. 4 indicates a station in which the washed and dried flat glass sheets are assembled with the mica coated surface inward;

Figure 3:
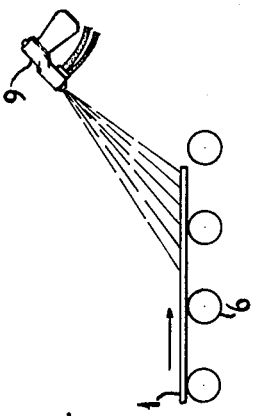
Figure 2:
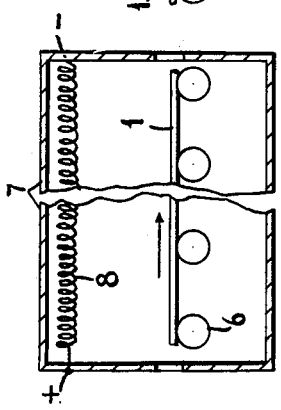
Figure 1:
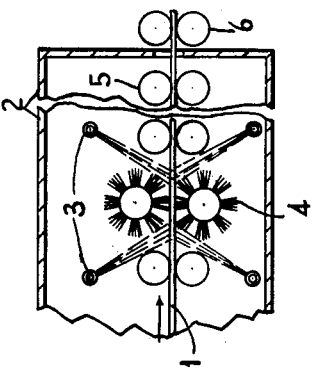
Figure 5:
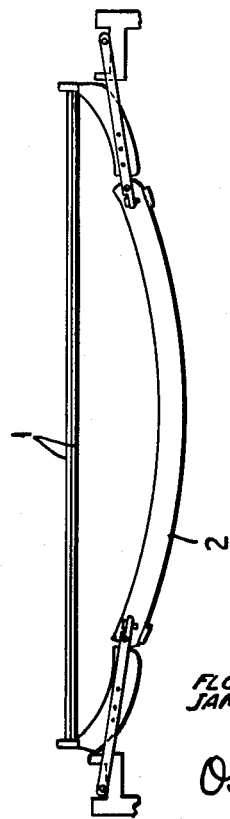
Fig. 5 is a more or less conventional showing of a suitable bending mold.

Referring now in detail to the drawings, flat glass sheets 1 of suitable size to produce the desired bent shape are passed through a suitable washing device such as 2 where water and a detergent are sprayed from pipes 3 onto the glass which is simultaneously scrubbed by brushes 4 acting on both sides of the glass and thereafter flushed with clean water. The glass is moved through the washing device by the rolls 5 in cooperation with conveyor rolls 6. The cleaned glass then moves upon conveyor rolls 6 through a suitable dryer device such as 7 where the water remaining on the opposite faces of the glass is evaporated as by electrical resistance coils 8 or some other means. The glass after emerging from the dryer 7 passes beneath a spray mechanism, such as spray gun 9, where a coating of parting material 10 is applied to the face of the glass as in Fig. 3. Preferably the glass then passes beneath a suitable fan 11 which removes excess parting material, dust and moisture, if any. Two of the flat glass sheets 1 are then assembled with the coated face inwardly and mounted in a suitable bending mold 12 as shown in Fig. 5.

Figure 6:
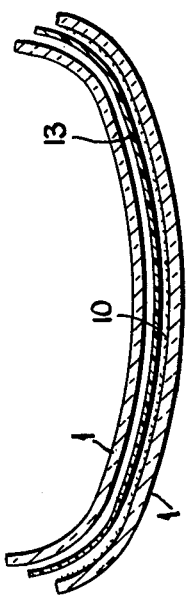
Fig. 6 shows the manner of assembling the bent sheets, parting material and thermoplastic material prior to laminating.

The mold is then passed through a bending lehr (not shown) where the glass is heated and bent upon the mold 12 to the desired shape. The pair of bent glass sheets 1 are then removed from the mold and passed to the station (not shown) where the thermoplastic laminating material 13 is inserted. This latter station is usually an air conditioned room. Here the laminating material is cut to size, washed and dried. Then for the first time the bent pair of glass sheets 1, as removed from the mold 12, are separated and suitably shaped sheet of laminating material 13 is placed between the glass sheets. As shown in Fig. 6, the bottom sheet 1 of the pair has the parting material 10 thereon and the laminating material 13 is placed upon the parting material. The size and amount of parting material upon the glass has been greatly exaggerated in Fig. 6 for purposes of illustration only. The assembled sheets of glass and laminating material are then placed in an autoclave.

In preparing the mica spray solution, we prefer to use mica of 1000 or 3000 mesh in a water suspension of 0.5% to 5.0% concentration. Such finely divided mica will suspend in water under slight agitation so that it can be sprayed with available commercial spray equipment. Excellent results have been obtained on bent windshields when using 1000 mesh mica of 1% concentration in a water suspension with the spray gun nozzle at a 45° angle to the glass and spaced about 32 inches above the surface of the glass. The conveyor speed was 9 feet per minute and the gun setting was to a light fan.

Many variations of the above conditions may be successfully used. In general, the selected combination of conditions should be such that substantially all the water evaporates between the gun and the glass plate so that the mica is substantially in the form of a dry deposit. The density of the deposited mica must be sufficient to prevent fusion and at the same time provide for sufficient spacing or thickness of mica particles to laminate out. By laminating out is meant the process wherein the mica particles optically unite with laminating plastic during the laminating process and are not visible in the completed windshield. Under the above operating conditions, a nozzle setting to feed 5 pounds of 1% (1000 mesh) mica suspension per hour gives good results in preventing fusion during bending and will effectively laminate out.

Figure 4:
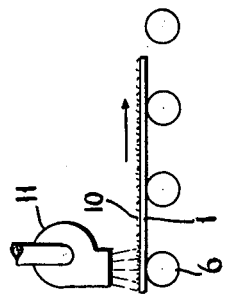

We have found that providing a blower fan just in advance of assembling the sheets, for mounting on the bending mold, insures complete removal of water vapor, excess mica and dust from the coated sheets before assembling. Such a fan 11 is shown in Fig. 4. It has been observed that mica tends to adhere very tenaciously to the glass, but that one mica particle does not exhibit the same adherence to another mica particle. Hence the fan 11 will readily remove the dry excess mica as well as any dust which may have been deposited upon the glass during or after the spraying operation.

As a substitute for mica we have experimented with various diatomaceous earths. These diatomaceous earths are the siliceous skeletons of pre-historic unicellular algae which are found in deposits of varying sizes all over the world and are marketed under various trade names under the generic term of diatomite or diatomaceous earth. Many of these are composed of finely divided silica. One of these, sold under the trade name Varcel has a refractive index of 1.468 which is practically identical with the refractive index of vinyl butyral which is 1.470. Vinyl butyral is a popular thermoplastic material used in laminating glass. Another suitable material sold under the trade name Super Floss is a finely divided silica.

Many variations of the equipment and manner of applying the parting material spray will suggest themselves to those skilled in the art. Likewise other suitable parting materials and liquids for holding them in suspension may be available in specific localities and can be substituted for the specific materials we have mentioned herein. It is to be understood, therefore, that we do not desire to limit ourselves to the precise details of disclosure except as made necessary by the scope of the appended claims.

We claim:

1. In a method of forming heat bent laminated glass sheets preparatory to laminating said sheets to opposite sides of an interlayer of thermoplastic laminating material, the steps of spraying a light uniform coating of a liquid suspension of a finely divided refractory material, that will optically unite with the thermoplastic laminating material, on the inner face of at least one of a pair of flat glass sheets prior to bending, and applying the plastic interlayer between the bent glass sheets without previous removal of the finely divided refractory material.

2. The method as in claim 1 wherein the spray comprises a liquid suspension of from about 0.5% to about 5% of a 1000 to 3000 mesh refractory material which is insoluble in the liquid.

3. The method as in claim 2 in which the refractory material is a diatomite.

4. The method as in claim 2 in which the refractory material is calcined diatomite.

5. The method as in claim 2 in which the refractory material is a fresh water type of diatomite.

6. The method as in claim 2 in which the refractory material is mica.

7. The method as in claim 2 in which the refractory material is silica.

8. The method of forming an assembly of bent laminated glass sheets which includes an interlayer of thermoplastic laminating material, comprising the steps of successively passing matched pairs of glass sheets through a washing and drying apparatus for effective removal of all foreign matter and adsorbed water from at least one surface of each sheet, spraying a liquid suspension of a finely divided refractory material, that will optically unite with the thermoplastic laminating material, on at least one clean surface of each pair of sheets, assembling the sheets in pairs with the clean surfaces in opposing relation, passing the assembled sheets through a heated passage and upon suitable molds for bending the pairs of glass sheets to the desired contour, separating the sheets and inserting a plastic interlayer without removing the refractory material from the coated surface of one of the sheets, then reassembling and treating these sheets in an autoclave in the usual manner.

9. In a method of forming bent laminated glass shapes comprising a pair of glass sheets and an interlayer of plastic material, the steps of spraying a liquid suspension of a finely divided refractory material, that will optically unite with the thermoplastic material, on the inner face of one of a pair of glass sheets, heat bending the pair of glass sheets, inserting the plastic interlayer between the bent sheets without removal of the refractory material, and bonding the whole in an autoclave under standard conditions of time, temperature and pressure to cause the optical union of the refractory material and the plastic interlayer.

10. In the method of forming heat bent laminated glass comprising a pair of bent glass sheets and a plastic interlayer, the steps of spraying a liquid suspension of a finely divided refractory material, that will optically unite with the plastic interlayer, on the inner face of one of a pair of clean, dry, flat glass sheets, heating and bending the flat sheets without fusion between the adjacent surfaces by reason of separation between the sheets afforded by the refractory material, inserting a suitable plastic interlayer between the sheets without removal of the refractory material, then effecting lamination in the usual manner within an autoclave at a temperature of about 15 to 25 degrees Fahrenheit above normal to effect laminating out of the refractory material.

11. In the process of forming heat bent laminated glass, the steps of spraying a liquid suspension of a 1% to 2% concentration of a finely divided refractory material that will optically unite with the thermoplastic interlayer on the inner face of one of a pair of flat glass sheets, heat bending the assembled pair of sheets to the desired contour, then inserting the plastic interlayer between the bent glass sheets without removal of the particles of refractory material.

References Cited in the file of this patent

UNITED STATES PATENTS

| | | |
|---|---|---|
| 2,357,537 | Orser | Sept. 5, 1944 |
| 2,392,770 | Ryan | Jan. 8, 1946 |